Patented Apr. 21, 1936

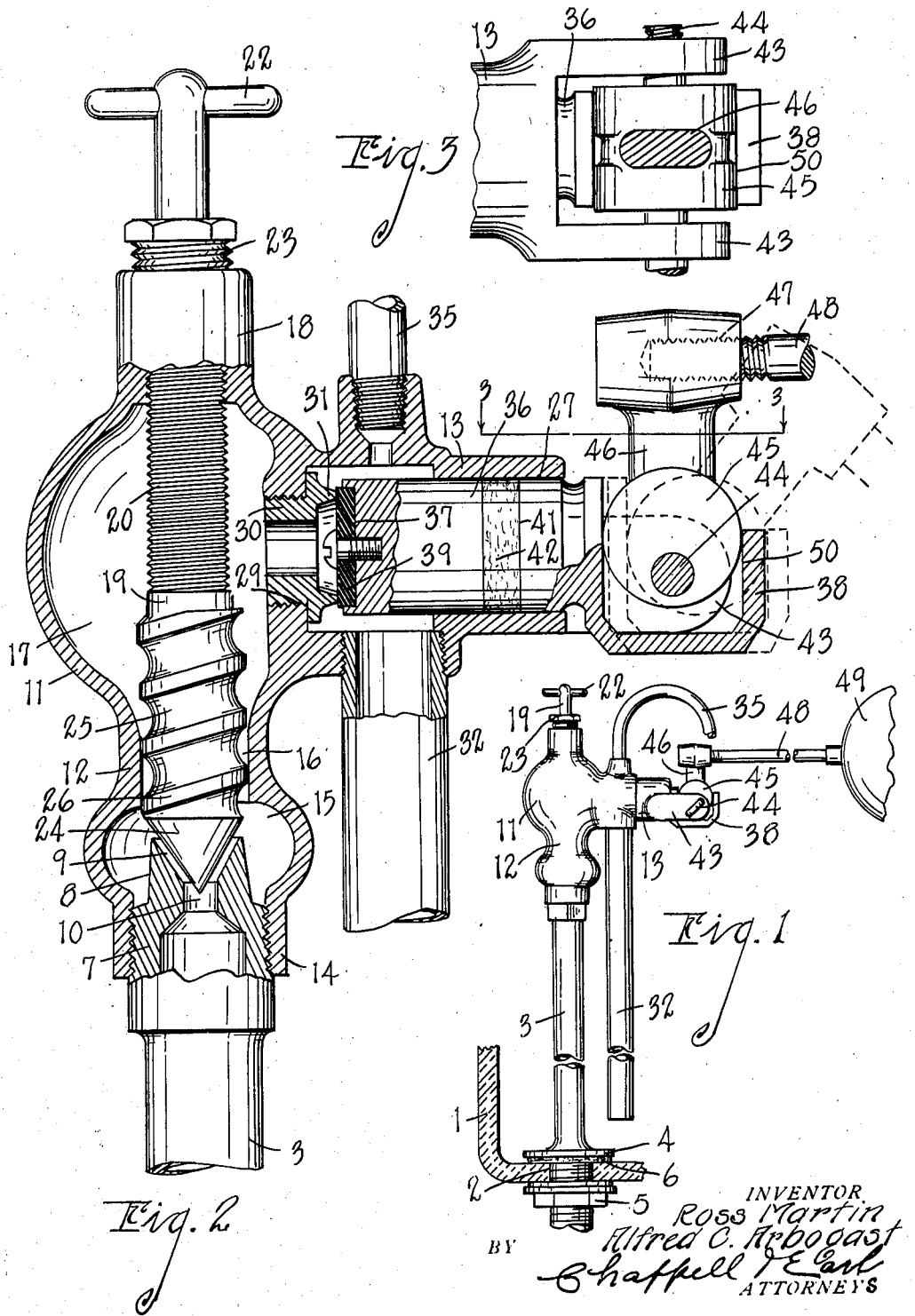

2,038,229

UNITED STATES PATENT OFFICE 2,038,229

FLUSHING VALVE

Ross Martin and Alfred C. Arbogast, Elkhart, Ind.

Application September 28, 1932, Serial No. 635,182

7 Claims. (Cl. 137—104)

The main objects of this invention are:

First, to provide a flushing valve which is very quiet in operation and may be adjusted so that this result is secured under a wide range of pressures.

Second, to provide a structure having these advantages which is comparatively simple in structure and easily adjusted to meet varying conditions.

Objects pertaining to details and economies of the invention will definitely appear from the description to follow. The invention is defined in the claims.

A structure which embodies the features of the invention is clearly illustrated in the accompanying drawing, in which:

Fig. 1 is a fragmentary view of a ball cock embodying the invention, a fragment of a water closet tank being shown in vertical section.

Fig. 2 is an enlarged fragmentary view, portions being shown in vertical central section.

Fig. 3 is a fragmentary horizontal section on line 3—3 of Fig. 2.

Referring to the drawing, 1 represents a tank having an opening 2 in the bottom thereof to receive the water supply pipe or riser 3, which is provided with a flange 4 resting on the bottom of the tank and held in assembled relation thereto by a nut 5. The gasket 6 is disposed between the flange and the tank and the nut and tank.

The inlet pipe has an enlarged externally threaded portion 7 at its upper end terminating in an upwardly tapered nipple 8. The nipple is provided with a conical valve seat 9 at the lower end of which is a restricted port 10.

The casing or body member 11 comprises a substantially vertical body portion 12 and a laterally extending outlet valve chamber 13, preferably cylindrical as illustrated. At its lower end the casing has an internally threaded portion 14 coacting with the threads on the riser. The nipple is disposed centrally of the inlet chamber 15 which is connected by the bore-like passage 16 to the intermediate hush chamber 17. The walls of the inlet and hush chambers are preferably curved, the capacity of the chamber 17 being substantially greater than that of the inlet chamber.

The casing has a cylindrical portion 18 at its upper end internally threaded to receive the threaded portion 20 of the valve stem 19. The stem is provided with a finger piece 22 and with a packing gland 23. The conical valve 24 coacts with the conical seat 9 to control the flow of water from the supply pipe. The valve has a spiral fluting at 25 disposed within the passage 16, the fluting providing ribs 26 coacting with the walls of the passage and constituting a spiral flow retarding passage between the inlet chamber and the hush chamber.

The position of the valve relative to the seat controls the inlet water so that this may be properly gaged for varying pressures and the spiral passage controls the flow discharging into the enlarged hush chamber, practically eliminating noise which ordinarily results from the rush of water through reduced apertures or through the valves, the flow of water being controlled before it reaches the discharge valve.

The threaded portion of the valve is of such length that the regulating valve can be entirely withdrawn from the passage if the pressure of the water is so low as to render that desirable.

The discharge valve chamber 13 is provided with a cylinder portion 27 for the plunger valve 36. This valve has a facing 39 arranged in a recess 37 and coacting with the annular valve seat 31 carried by the port member 30 which is threaded into a bore 29 in the casing. The discharge pipe 32 is connected to the bottom of the discharge valve chamber while the refill tube 35 is connected to the top thereof.

The plunger valve is provided with an annular groove 41 for the packing 42. The casing is provided with a pair of pivot arms 43 projecting at each side of the projecting end of the plunger which is in the form of a yoke or U-shaped cam follower 38. These arms carry a pivot 44 for the eccentric cam 45 which is in bearing engagement with opposed portions of the cam follower or yoke so that as the cam is rotated about its pivot the plunger is reciprocated as indicated by dotted lines in Fig. 2. The eccentric or cam is provided with a crank arm 46 having a transverse bore 47 into which the end of the float arm or lever 48 is threaded, the float being indicated at 49. The crank arm 46 coacts with the outer portion 50 of the cam follower which constitutes a stop limiting the downward movement of the float within the tank.

Our improved flushing valve is very quiet in operation and may, as stated, be adjusted to suit any range of water pressure so that a desired volume of water will be admitted without whistling or other objectionable noise.

We have illustrated and described our improvements in an embodiment which has proved highly satisfactory. We have not attempted to illustrate other embodiments of which our invention might be capable as it is believed that this disclosure will enable those skilled in the art to embody or adapt the invention as may be desired.

Having thus described our invention what we claim as new and desire to secure by Letters Patent is:

1. In a flushing valve or the like, the combination of a casing having an inlet chamber, a discharge chamber and an intermediate hush chamber, said intermediate chamber being of a capacity substantially larger than said inlet chamber and connected thereto by a bore-like passage and to said discharge chamber by a port opening to the side of the intermediate chamber, an inlet pipe provided with a discharge tip projecting centrally into said inlet chamber and provided with a port and a conical valve seat axially alined with said passage, and a regulating valve extending into said passage and having a conical tip coacting with said conical seat and a spiral rib coacting with the wall of said passage providing a spiral connecting passage for said inlet and hush chambers, said regulating valve being threaded for adjustment in said casing, its threaded portion being of such length that the valve may be fully retracted from said passage.

2. In a flushing valve or the like, the combination of a casing having an inlet chamber and a hush chamber, said chambers having curved walls, said hush chamber being of a capacity substantially greater than said inlet chamber and connected thereto by a bore-like passage and having a discharge port, an inlet pipe provided with a discharge tip projecting centrally into said inlet chamber and provided with a port and a conical valve seat axially alined with said passage, and a regulating valve extending into said passage and having a conical tip coacting with said conical seat and a spiral rib coacting with the wall of said passage providing a spiral connecting passage for said inlet and hush chambers, said regulating valve being threaded for adjustment in said casing, its threaded portion being of such length that the valve may be fully retracted from said passage.

3. A flushing valve comprising a casing having an inlet chamber, a discharge chamber and an intermediate hush chamber, said inlet and intermediate chambers having spheroidally curved walls and being connected by a passage, the intermediate chamber being of substantially greater capacity than the inlet chamber, and a regulating valve for controlling the delivery of water to said inlet chamber and for retarding the flow of water through said passage.

4. A flushing valve comprising a casing having an inlet chamber and a hush chamber, said inlet and hush chambers having spheroidally curved walls and being connected by a passage, the hush chamber being of substantiallly greater capacity than the inlet chamber, and a regulating valve for controlling the delivery of water to said inlet chamber and having a stem extending through said passage and provided with spiral means for retarding the flow of water through said passage.

5. A ball cock comprising an inlet pipe having a conical female valve seat therein, a fitting provided with a body member mounted on said pipe and having an inlet chamber, a bore and an enlarged hush chamber, the latter having a discharge outlet in the wall thereof, and a valve stem threaded to said body member for longitudinal adjustment and having a conical male valve at its lower end coacting with said female valve seat and a spiral groove coacting with said bore, the length of said stem being such that it may be raised to clear said bore of restriction for the passage of water at low pressure.

6. A ball cock comprising an inlet pipe having a conical female valve seat therein, a fitting provided with a body member mounted on said pipe and having an inlet chamber, a bore and an enlarged hush chamber, the latter having a discharge outlet, and a valve stem threaded to said body member for longitudinal adjustment and having a conical male valve at its lower end coacting with said female valve seat and a spiral groove coacting with said bore.

7. A ball cock comprising an inlet pipe having a reduced tapered upper end, an upwardly facing female valve seat therein and a restricted port opening thereto, a fitting provided with a vertical body member mounted on said pipe and having an inlet chamber, a vertical bore and an enlarged hush chamber, the latter having a discharge outlet in the wall thereof, and a cut-off valve stem threaded to the upper end of said body member for vertical adjustment and having a downwardly pointing conical male valve at its lower end coacting with said female valve seat and a spiral groove coacting with said bore, the length of said stem being such that it may be raised to clear said bore of restriction for the passage of water at lower pressure.

ROSS MARTIN.
ALFRED C. ARBOGAST.